G. E. KARL.
HANDLE LOCKING DEVICE FOR ROLLERS.
APPLICATION FILED NOV. 19, 1913.
1,105,279.
Patented July 28, 1914.
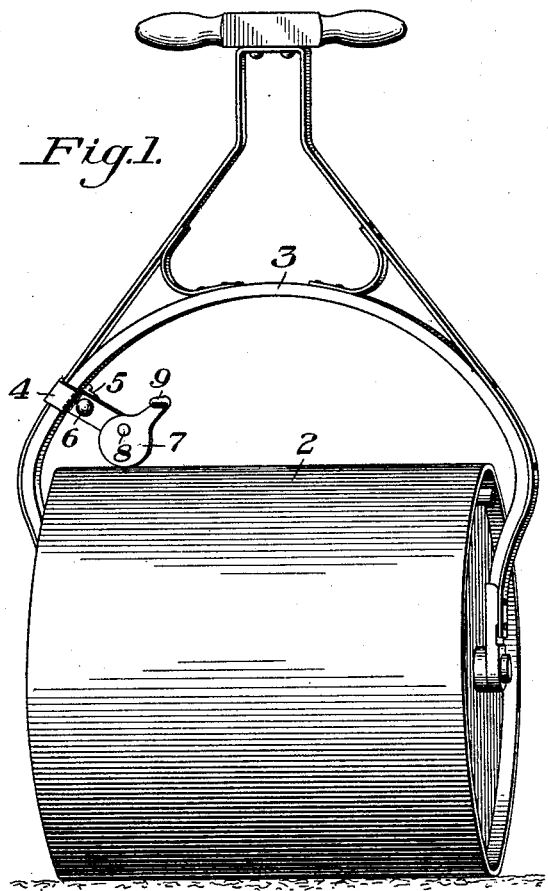
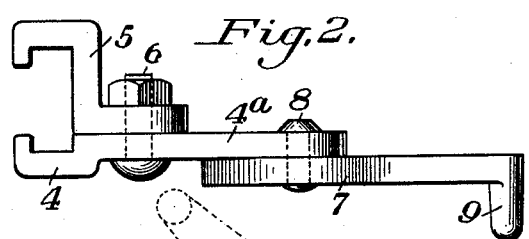
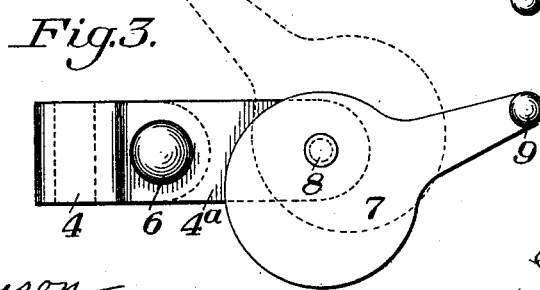
WITNESSES
R. A. Balderson
Jesse B. Heller
INVENTOR
Geo. E. Karl,
by Bakewell, Byrnes & Parmelee,
Attys.

UNITED STATES PATENT OFFICE.

GEORGE EMIL KARL, OF BEREA, OHIO, ASSIGNOR TO THE DUNHAM COMPANY, OF BEREA, OHIO, A CORPORATION OF OHIO.

HANDLE-LOCKING DEVICE FOR ROLLERS.

1,105,279.  Specification of Letters Patent.  Patented July 28, 1914.

Application filed November 19, 1913. Serial No. 802,005.

*To all whom it may concern:*

Be it known that I, GEORGE EMIL KARL, a citizen of the United States, and a resident of Berea, Cuyahoga county, Ohio, have invented a new and useful Improvement in Handle-Locking Devices for Rollers, of which the following is a full, clear, and exact description, reference being had to the accompanying drawings, forming part of this specification, in which—

Figure 1 is a perspective view of one form of roller, showing one form of locking device attached to the handle; Fig. 2 is a plan view of the locking device and the clamping members for securing it to the handle; and Fig. 3 is a front view thereof.

This invention relates to roller handle locking devices, and is arranged to provide a cheap and efficient device of this character, which is arranged to lock the handle in any desired position with relation to the roller.

In rollers of this kind it is very desirable to retain the handle in an upright position when the roller is not in use, and heretofore this was accomplished by counterweighting the handle so as to maintain it at a predetermined angle. There are several objections to counterweighting the handle, and particularly the handle attached to water ballast rollers, in which the weight of the roller is obtained by means of water or sand within the roller. The counterweighting necessarily increases the cost of manufacture, freight charges, and labor in handling the rollers during shipment.

The precise nature of my invention will be best understood by reference to the accompanying drawings, which will now be described, it being premised, however, that various changes may be made in the details of construction and general arrangement of the parts without departing from the spirit and scope of my invention, as defined in the appended claims.

In the drawings the numeral 2 designates the drum of the roller, to which is pivotally connected a handle 3. Connected to the yoke of the handle is a bracket having forked members 4 and 5, which engage the yoke member of the handle, and are secured in position by means of a screw 6. The member 4 is provided with an extension 4$^a$ to which is pivotally connected an eccentric or cam member 7 by means of a pin or rivet 8, and is provided with an operating handle 9 for actuating it. The bracket is placed on the handle in such a position that when the cam member is rocked to the position shown in Fig. 1, the handle 3 will be locked against movement with relation to the roller drum 2, and when thrown into the position shown in dotted lines in Fig. 3, the handle is free to move about its pivotal connection with the drum, or the drum is free to rotate with relation to the handle.

It will be readily understood by those familiar with the art that other locking devices than that shown in the drawings can be readily used for locking the handle to the roller drum, and also that the locking device may be secured to other portions of the handle, and further that the locking device may be duplicated on the other side of the handle.

The advantages of my invention result from the provision of a lock for locking the handle of a roller to the drum to retain the same in any desired position.

I claim:

1. A roller having a drum, a handle pivoted thereto, and a locking device for locking the handle against movement with relation to the drum; substantially as described.

2. A roller having a drum, a handle pivoted thereto, and a cam pivotally connected to the handle and arranged to engage the drum to lock the two members from movement with relation to each other; substantially as described.

3. A roller having a drum, a handle pivoted thereto, a bracket connected to the handle, and a cam lever pivotally connected to the bracket and arranged to engage the drum; substantially as described.

4. A locking device for roller handles, comprising a clamp having jaw members, a bolt for securing said jaw members to each other, and an eccentric cam pivoted to one of said jaw members, substantially as described.

5. A locking device for roller handles, comprising a clamp having jaw members, means for drawing said jaw members to each other, and a locking device connected to one of the jaw members for locking the handle to the roller drum; substantially as described.

In testimony whereof, I have hereunto set my hand.

GEORGE EMIL KARL.

Witnesses:
A. F. EHRBAR,
C. EHRBAR.